United States Patent
Khare et al.

(10) Patent No.: US 12,079,097 B2
(45) Date of Patent: Sep. 3, 2024

(54) TECHNIQUES FOR TESTING SEMICONDUCTOR DEVICES

(71) Applicant: NVIDIA CORPORATION, Santa Clara, CA (US)

(72) Inventors: Animesh Khare, Bangladore (IN); Ashish Kumar, Patna (IN); Shantanu Sarangi, Saratoga, CA (US); Rahul Garg, Jind (IN)

(73) Assignee: NVIDIA Corporation, Santa Clara, CA (US)

( * ) Notice: Subject to any disclaimer, the term of this patent is extended or adjusted under 35 U.S.C. 154(b) by 202 days.

(21) Appl. No.: 17/075,628

(22) Filed: Oct. 20, 2020

(65) Prior Publication Data
US 2022/0121542 A1    Apr. 21, 2022

(51) Int. Cl.
*G06F 11/273*  (2006.01)
*G06F 11/22*   (2006.01)
*G06F 13/28*   (2006.01)
*G06F 13/42*   (2006.01)

(52) U.S. Cl.
CPC ...... *G06F 11/2733* (2013.01); *G06F 11/2268* (2013.01); *G06F 13/28* (2013.01); *G06F 13/4282* (2013.01); *G06F 2213/0026* (2013.01)

(58) Field of Classification Search
None
See application file for complete search history.

(56) References Cited

U.S. PATENT DOCUMENTS

| | | | | |
|---|---|---|---|---|
| 6,081,852 | A * | 6/2000 | Baker | H04L 49/901 710/24 |
| 9,495,245 | B2 * | 11/2016 | Peddle | G06F 13/4059 |
| 10,255,215 | B2 * | 4/2019 | Breakstone | G06F 13/16 |
| 10,740,270 | B2 * | 8/2020 | Depew | G06F 11/349 |
| 11,436,186 | B2 * | 9/2022 | Catiller | G06F 15/7867 |
| 11,609,798 | B2 * | 3/2023 | Sivaramakrishnan | G06F 9/5077 |
| 2005/0022065 | A1 * | 1/2005 | Dixon | G11C 29/848 714/42 |
| 2009/0224920 | A1 * | 9/2009 | Chiang | G06Q 10/08 340/572.1 |
| 2010/0138583 | A1 * | 6/2010 | Schauer | G05B 19/409 711/E12.001 |
| 2015/0355965 | A1 * | 12/2015 | Peddle | G06F 11/1048 710/308 |
| 2016/0224489 | A1 * | 8/2016 | Mishra | G06F 13/364 |

(Continued)

*Primary Examiner* — Henry Tsai
*Assistant Examiner* — Christopher A Bartels
(74) *Attorney, Agent, or Firm* — Artegis Law Group, LLP

(57) ABSTRACT

Techniques for testing semiconductor devices include a semiconductor device having a plurality of components, a test bus, and a test data transfer unit. The test data transfer unit receives, from a host computer, configuration information for performing a test of the semiconductor device, reads, via a high-speed data transfer link, test data associated with the test from memory of the host computer using direct memory access, sends the test data to the plurality of components via the test bus, causes one or more operations to be performed on the semiconductor device to effect at least a portion of the test, and after the one or more operations have completed, retrieves test results of the at least a portion of the test from the test bus and stores, via the high-speed data transfer link, the test results in the memory of the host computer using direct memory access.

20 Claims, 7 Drawing Sheets

(56) References Cited

U.S. PATENT DOCUMENTS

| | | | | |
|---|---|---|---|---|
| 2016/0299855 | A1* | 10/2016 | Pitigoi-Aron | G06F 13/4295 |
| 2017/0105086 | A1* | 4/2017 | Wesby | H04W 4/50 |
| 2018/0004701 | A1* | 1/2018 | Pappu | G06F 13/4282 |
| 2018/0060261 | A1* | 3/2018 | Chhor | G06F 13/4282 |
| 2019/0033845 | A1* | 1/2019 | Cella | G06N 7/01 |
| 2019/0235890 | A1* | 8/2019 | Schnoor | G06F 13/4068 |
| 2019/0243753 | A1* | 8/2019 | Zhang | G06F 11/368 |
| 2019/0385057 | A1* | 12/2019 | Litichever | H04L 63/14 |
| 2020/0142857 | A1* | 5/2020 | Catiller | G06F 9/3867 |
| 2021/0010954 | A1* | 1/2021 | Adler | G06T 7/0012 |
| 2021/0397448 | A1* | 12/2021 | Ramesh | G06F 13/124 |
| 2022/0006238 | A1* | 1/2022 | Mithani | H01R 13/506 |
| 2022/0124930 | A1* | 4/2022 | Tsorng | H05K 7/026 |

* cited by examiner

TECHNIQUES FOR TESTING SEMICONDUCTOR DEVICES

FIELD

The various embodiments relate generally to semiconductor devices and semiconductor device production and, more particularly, to techniques for testing semiconductor devices.

BACKGROUND

In order to ensure that semiconductor devices, such as application-specific integrated circuits (ASICs), systems on a chip (SOCs), graphics processing units (GPUs), central processing units (CPUs), function properly, these semiconductor devices often undergo rigorous testing. For example, after a semiconductor device is manufactured, the semiconductor device is typically subjected to numerous manufacturing, functional, and/or system-level tests. As another example, once the semiconductor device is incorporated into a system, the semiconductor device and the system are subjected to numerous in-system or field tests. In each of these different types of tests, a test access mechanism of the semiconductor device is used to transfer test data into the semiconductor device, where, in most situations, known test values are provided as inputs to the various gates and components on the semiconductor device. Once the test data is transferred to the gates and components of the semiconductor device, the device performs regular operations using the test data to generate test results. The test access mechanism is then used to transfer the test results out of the semiconductor device, and the test results are compared to a set of expected results to determine whether the semiconductor device passed or failed the test. This testing process is repeated until all of the tests for the semiconductor device are completed.

Existing techniques for system-level testing of semiconductor devices typically implement specialized automated test equipment (ATE) that is connected to one or more dedicated test or multi-purpose input/output circuits on the semiconductor device. For a given test, the ATE transfers the relevant test data into the semiconductor device via the input/output circuits, and the data is distributed to the gates and components using a test bus. As noted above, the semiconductor device performs operations using the test data to generate the test results, and then the ATE transfers the test results out of the semiconductor device via the test bus and the input/output circuits.

The above approach for system-level testing of semiconductor devices has multiple drawbacks. First, each new generation of semiconductor device is roughly thirty percent more complex than the immediately previous generation of semiconductor device because of larger and more complex functionality implemented by the new generation. The added complexity increases the amount of test data and test results for each test as well increases the number of tests that are performed. Further, because of the functionality added with each generation, dedicated test input/output pins or pads may not be available on semiconductor devices and fewer multi-purpose input/output pins or pads may be available for use in the test mode. As a result, the ATE is required to transfer more test data and test results using fewer input/output pins or pads, which increases the amount of testing time for the semiconductor device. As a general matter, longer testing times reduce the number of semiconductor devices that can be manufactured and tested and, therefore, are undesirable.

Second, when using an ATE to test a semiconductor device, the semiconductor device is mounted to a specially designed circuit board used for testing. As a result, an ATE cannot be used to test a semiconductor device after the semiconductor device is installed in a final system. Because in-system tests are now mandated under ISO26262 for semiconductor devices used in automotive systems, non-ATE-based testing mechanisms are needed.

Third, testing connections are typically not available after the semiconductor device is installed in the final system so an ATE cannot be connected to the semiconductor device after the ATE is installed in the final system. When an ATE performs a manufacturing test of the semiconductor device, the semiconductor device is not operating under the same power, temperature, and/or environmental conditions present during actual operation of the semiconductor device. As a result, tests performed by the ATE often fail to correlate with functional tests due to changes in power, temperature, and/or environmental conditions found during actual operation of the semiconductor device.

As the foregoing illustrates, what is needed in the art are more effective techniques for testing semiconductor devices.

SUMMARY

One embodiment of the present invention sets forth a technique for testing a semiconductor device. The technique includes using a device having a plurality of components, a test bus, and a test data transfer unit. The test data transfer unit receives, from a host computer, configuration information for performing a test of the semiconductor device, reads, via a high-speed data transfer link and using direct memory access, test data associated with the test from memory of the host computer, sends the test data to the plurality of components via the test bus, causes one or more operations to be performed on the semiconductor device to effect at least a portion of the test, and after the one or more operations have completed, retrieves test results of the at least a portion of the test from the test bus and stores, via the high-speed data transfer link, the test results in the memory of the host computer using direct memory access.

One technical advantage of the disclosed techniques relative to the prior art is that the data transfer rates for transferring test data into semiconductor devices and transferring test results out of the semiconductor devices can be substantially increased, thereby reducing overall test time for the semiconductor devices. Another technical advantage is that the disclosed techniques allow testing to be performed on a semiconductor device using the existing high-speed link present within the semiconductor device, which enables testing to be performed after the semiconductor device has deployed into a final system. Thus, the disclosed techniques enable system-level testing under environmental conditions typically experienced by the semiconductor device during actual operation and enable system-level testing in the field, such as the system-level testing required under ISO26262 for automotive systems. Additionally, the disclosed techniques enable semiconductor devices to be tested without the use of specialized automated test equipment. These technical advantages provide one or more technological improvements over prior art approaches.

BRIEF DESCRIPTION OF THE DRAWINGS

So that the manner in which the above recited features of the various embodiments can be understood in detail, a more particular description of the various embodiments, briefly summarized above, may be had by reference to embodiments, some of which are illustrated in the appended drawings. It is to be noted, however, that the appended drawings illustrate only typical embodiments of the inventive concepts and are therefore not to be considered limiting of its scope, for the invention may admit to other equally effective embodiments.

DETAILED DESCRIPTION

Figure 1:
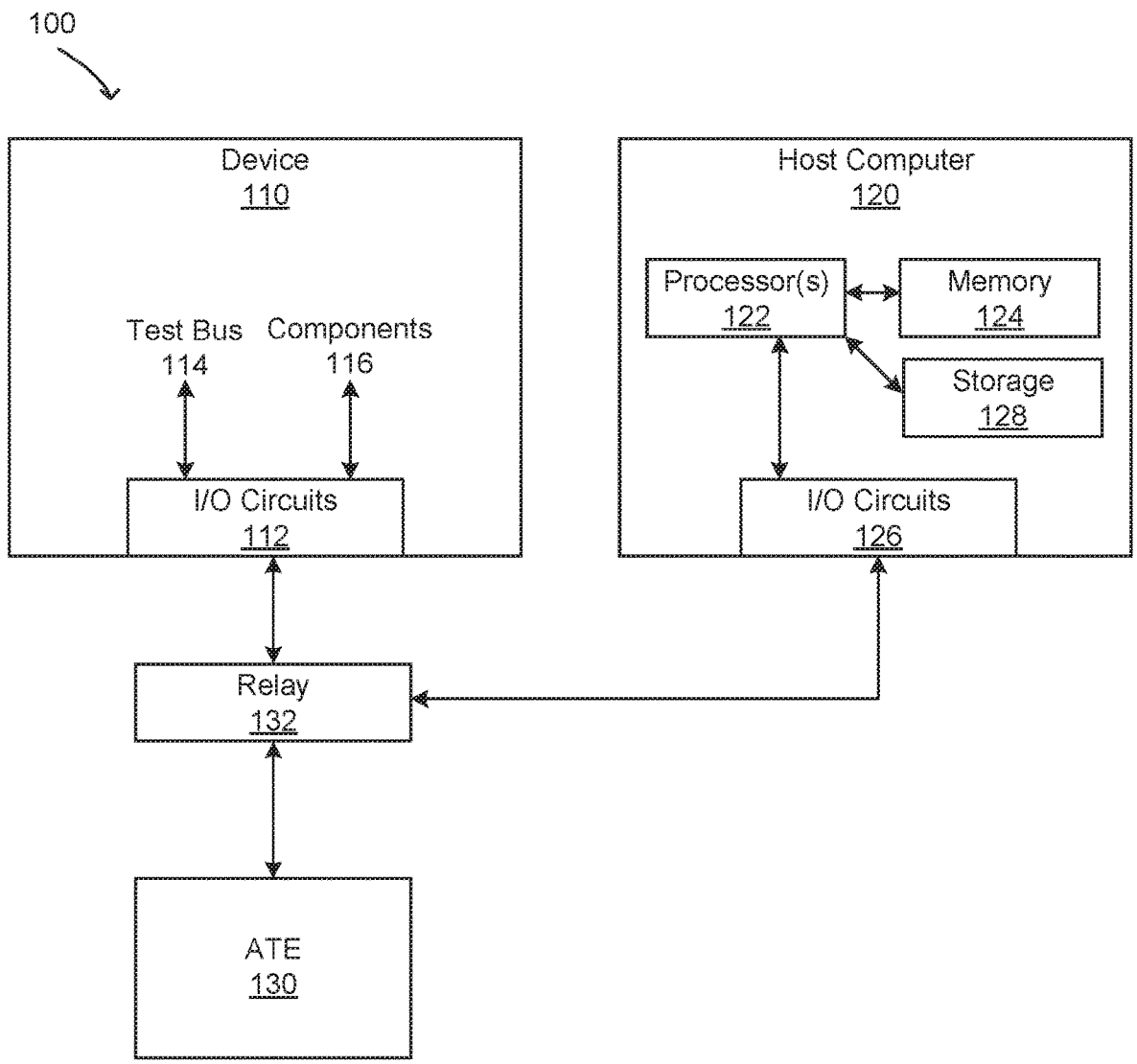
FIG. 1 illustrates an exemplary test environment, according to various embodiments.

In the following description, numerous specific details are set forth to provide a more thorough understanding of at least one embodiment. However, it will be apparent to one skilled in the art that the inventive concepts may be practiced without one or more of these specific details.

General Overview

Computer chips and devices, such as application-specific integrated circuits (ASICs) systems on a chip (SoCs), graphics processing units (GPUs) and central processing units (CPUs), are typically tested extensively to ensure that the computer chips will operate properly when the computer chips are used in a final system, such as a computing system that may be included in an autonomous vehicle. A test of a computer chip typically involves sending specific test data to the computer chip that is designed to test one or more features or capabilities of the computer chip. The one or more features or capabilities are then tested, and results of the test are then retrieved from the computer chip and compared to expected results associated with the test. If the results of the test are the same as the expected results, then the test is passed. If the results of the test are different from the expected results, then the test is failed. The testing process is then repeated until all the tests associated with the computer chip have been performed.

Because computer chips are very complex, the amount of test data that is sent to the computer chip and the amount of test results that are retrieved from the computer chip are quite large. Typically, most of the time spent testing the computer chip is spent sending the test data and retrieving the test results. Thus, the amount of time spent testing a computer chip can be significantly reduced by sending the test data and retrieving the test results using a high-speed data transfer connection that is already present on many computer chips.

To perform a test on a computer chip, a computer is connected to the computer chip using the high-speed data transfer connection. The computer stores test data in the memory of the computer. The computer then sends instructions to a high-speed test data transfer unit on the computer chip being tested. The instructions tell the high-speed test data transfer unit where to find the test data in the memory, how much test data there is, and where to store the test results in the memory. The computer then tells the high-speed test data transfer unit to begin the test. After the computer is told that the test is complete, the computer reads the test results from the memory and provides the test results to a testing program that will compare the test results to the expected results associated with the test.

After receiving the instruction to begin the test, the high-speed test data transfer unit reads the test data directly from the memory of the computer and copies the test data to the computer chip using the high-speed data transfer connection. As the high-speed test data transfer unit receives the copy of the test data the high-speed test data transfer unit distributes the test data to the components on the computer chip that are being tested. Once the high-speed test data transfer unit receives and distributes all the test data, the high-speed transfer unit starts the test on the computer chip, which causes the components on the computer chip to perform ore or more operations using the test data. After at least a portion of the test completes, the high-speed transfer unit retrieves the test results from the components on the computer chip and copies the test results to the location in the memory provided in the instructions received from the computer using the high-speed data transfer connection. After the test results are copied to the memory of the computer, the high-speed test data transfer unit tells the computer that the test is finished. Importantly, once the high-speed test data transfer unit has received the instructions from the computer, the high-speed test data transfer unit is able to get the test data, perform the test, and store the test results automatically without further supervision or involvement by the computer. Because the computer does not need to supervise the high-speed test data transfer unit, the computer can be used for other things while testing of the computer chip is taking place.

As an example, a test to determine whether a computer chip has manufacturing defects can be implemented using this testing approach. The test data stored in the memory by the computer could include configuration data and input data for components on the computer chip. The high-speed test data transfer unit copies the test data and uses the test data to configure the appropriate components on the computer chip and provide the input data for those components. The high-speed test data transfer unit then runs the test and copies the results of the test to the memory of the computer. Once the computer is told that the test is complete, the computer can send the results of the test to the testing program, which compares the results to the expected results to determine whether a manufacturing defect has been detected.

This testing approach can also be adapted to allow the high-speed test data transfer unit to perform multiple tests in a row without further supervision or involvement by the computer. To do this, the computer also stores, as part of the test data in the memory, the instructions associated with the second test. Thus, once the high-speed test data transfer unit completes a first test, the high-speed test data transfer unit can access the instructions associated with the second test that are copied along with the test data associated with the first test. The high-speed data transfer unit can then perform the second test according to the instructions associated with the second test. Instructions for a third test can also be included in the test data associated with the second test, etc, allowing the high-speed data transfer unit to continue performing tests as long as additional instructions for those tests are provided.

Test Environment Architecture

FIG. 1 illustrates an exemplary test environment 100, according to various embodiments. As shown in FIG. 1, test environment 100 includes a device 110 to be tested, a host computer 120, and an automated test equipment (ATE) 130. In some embodiments, device 110 may be a semiconductor device, an ASIC, a SoC, a computing device, and/or the like. Device 110 includes a plurality of input/output (I/O) circuits 112 (sometimes referred to as IOs) though which device 110 is coupled to other devices in test environment 100, such as host computer 120 and ATE 130. Each of the one or more I/O circuits 112 may be associated with a pin or pad on device 110 through which signals (e.g., analog and/or digital signals) may be transmitted from and/or received by device 110. In some embodiments, each of the one or more I/O circuits 112 may also include signal conditioning circuitry, drivers, and/or the like.

One or more of the I/O circuits 112 may be used to facilitate testing of device 110. As shown in FIG. 1, the one or more I/O circuits 112 are multi-purpose I/O circuits 112 that each couple an associated pin or pad to either a test bus 114 or other components 116 of device 110. In some embodiments, test bus 114 may be consistent with a test interface of device 110. The other components 116 are used to implement the functionality of device 110 and are to be tested. In some embodiments, the other components 116 may include logic gates, clocks, buses, and/or the like. In some embodiments, the other components 116 may be consistent with portions of an interface for a high-speed data transfer link, such as a peripheral component interface express (PCIe) link. Each of the multi-purpose I/O circuits 112 includes multiplexing and/or demultiplexing circuitry that couples the associated pin or pad to either a line of test bus 114 or an input or output of one or more of the other components 116 depending on a mode of the multi-purpose I/O circuit 112. When the multi-purpose I/O circuit 112 is in a test mode, the pin or pad associated with multi-purpose I/O circuit 112 is coupled to test bus 114, and when the multi-purpose I/O circuit 112 is not in the test mode, the pin or pad associated with the multi-purpose I/O circuit 112 is coupled to one or more of the other components 116. Although not shown in FIG. 1, in some embodiments, the one or more I/O circuits 112 may additionally include one or more dedicated I/O circuits 112 that are coupled only to test bus 114 or only to the other components 116. In such embodiments, the one or more dedicated I/O circuits 112 may not include the multiplexing and/or demultiplexing circuitry.

In some embodiments, host computer 120 may be a desktop computer, a laptop computer, a smart phone, a personal digital assistant (PDA), tablet computer, or any other type of computing device configured to receive input, process data, and optionally display images, and is suitable for practicing one or more embodiments. Host computer 120 is configured to run various programs and may use device 110 to perform various tasks. It is noted that host computer 120 as described herein is illustrative and that any other technically feasible configurations fall within the scope of the present disclosure.

As further shown in FIG. 1, host computer 120 includes one or more processors 122, memory 124, one or more I/O circuits 126, and storage 128. Each of the one or more processors 122, memory 124, the one or more I/O circuits 126, and/or storage 128 may be coupled together using one or more interconnects or buses, such as indicated by the various arrows showing connections between the one or more processors 122, memory 124, the one or more I/O circuits 126, and/or storage 128. Each of the one or more processors 122 may be consistent with any suitable type of processor including, without limitation, a central processing unit (CPU), a graphics processing unit (GPU), an application-specific integrated circuit (ASIC), a field programmable gate array (FPGA), an artificial intelligence (AI) accelerator, a microprocessor, a multi-core processor, a digital signal processor (DSP), and/or the like. In some embodiments, the one or more processors 122 may include a combination of processors such as a CPU configured to operate in conjunction with a GPU. In general, each of the one or more processors 122 may be any technically feasible hardware unit capable of processing data and/or executing software applications. Further, in the context of this disclosure, the computing elements shown in host computer 120 may correspond to a physical computing system (e.g., a system in a data center or in an autonomous vehicle) or may be a virtual computing instance executing within a computing cloud or virtual machine.

In some embodiments, the one or more I/O circuits 126 are used to couple host computer 120 to other devices in test environment 100. As shown, the one or more I/O circuits 126 couple host computer 120 to the one or more I/O circuits 112 on device 110 via a relay 132. However, others of the one or more I/O circuits 126 may be coupled directly to the one or more I/O circuits 126 on device 110 and/or to other devices (not shown). Each of the one or more I/O circuits 126 may be associated with a pin or pad on host computer 120 through which signals (e.g., analog and/or digital signals) may be transmitted from and/or received by host computer 120. In some embodiments, each of the one or more I/O circuits 126 may also include signal conditioning circuitry, drivers, and/or the like.

In some embodiments, storage 128 includes non-volatile storage for applications and data, and may include fixed or removable disk drives, flash memory devices, and CD-ROM, DVD-ROM, Blu-Ray, HD-DVD, or other magnetic, optical, or solid state storage devices. In some embodiments, software programs to be executed by the one or more processors 122 may be stored in storage 128 and loaded into memory 124 when executed. And although not expressly shown, one or more portions of storage 128 may be located separated from host computer 120.

In some embodiments, memory 124 includes a random access memory (RAM) module, a flash memory unit, or any other type of memory unit or combination thereof. The one or more processors 122 are configured to read data from and write data to memory 124. Memory 124 may further include various software programs that can be executed by the one or more processors 122 and application data associated with the software programs.

In some embodiments, ATE 130 is a specialized computing device designed to test devices, such as device 110. As shown in FIG. 1, ATE 130 is coupled to device 110 though relay 132. Relay 132 functions as a bridge between ATE 130, device 110, and host computer 120. ATE 130 includes signal conditioning circuitry, drivers, and/or the like so that signals transmitted between ATE 130 and the one or more I/O circuits 112 of device 110 are compatible. In addition, relay 132 includes multiplexing and/or demultiplexing circuitry to control whether ATE 130 is coupled to the one or more I/O circuits 112 (e.g., when device 110 is being tested) or whether the one or more I/O circuits 126 are coupled to the one or more I/O circuits 112 (e.g., when device 110 is not being tested).

To test device 110, ATE 130 first reads test data for device 110 from storage, such as storage consistent with storage 128. ATE 130 then puts device 110 in a test mode so that the one or more I/O circuits 112 are coupled to test bus 114 and configures relay 132 so that relay 132 couples ATE 130 to the one or more I/O circuits 112. ATE then transfers the test data to test bus 114 through relay 132 and the one or more I/O circuits 112. Test bus distributes the test data to the components 116 so as to place each of the components 116 in a desired state and/or to provide inputs to each of the components 116. ATE 130 then instructs device 110 to being a test through test bus 114. After waiting for the test to complete, ATE 130 then retrieves test results associated with the test via test bus 114, the one or more I/O circuits 112, and relay 132. ATE 130 can then compare the test results to expected results of the test or provide the test results to another system (not shown) to compare the test results to the expected results of the test. ATE 130 can then preform additional tests by repeating the process.

Testing test device 100 using ATE 130 has multiple drawbacks. First, for complex devices, like device 110, there is a large amount of test data that ATE 130 has to transfer to device 110 for each test as well as a large amount of test results that ATE 130 has to retrieve from device 110. For example, when ATE 130 is capable of sending data to or receiving data from each of the one or more I/O circuits 112 at rate of 200 MHz using six I/O circuits 112, ATE 130 is limited to transferring 150 Mbytes per second (=6×200/8). This data transfer rate can be quite limiting when device 110 includes millions of components requiring hundreds or thousands of tests and typically becomes the dominant factor in determining how long it takes to test device 110. This delay can be mitigated by using a faster ATE, but the costs to purchase and/or operate faster and faster ATEs is expensive. Second, because of the use of relay 132 and the multi-purpose nature of the one or more I/O circuits 112, ATE 130 cannot be used for in-system tests, such as those mandated under ISO26262 for automotive systems. Third, ATE 130 may not be able to run the tests on device 110 under the same environmental conditions (e.g., power, temperature, etc.) that device 110 may be subjected to in the final system in which device 110 is installed.

Accordingly, what is needed are techniques for testing a device, that do not require an ATE.

Alternative Test Environment Architecture

Figure 2:
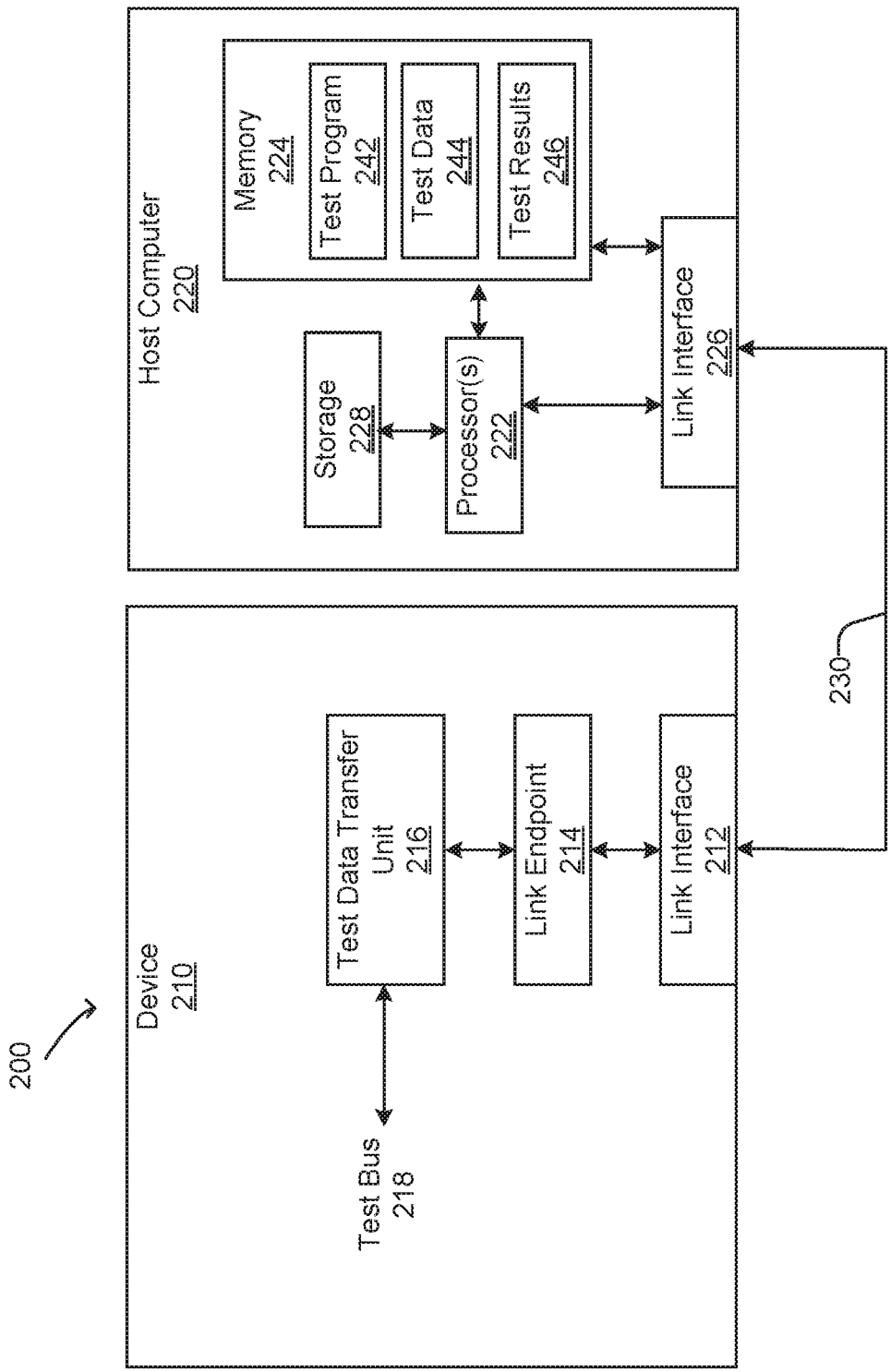
FIG. 2 illustrates another exemplary test environment, according to other various embodiments.

FIG. 2 illustrates another exemplary test environment 200, according to other various embodiments. As shown in FIG. 2, test environment 200 includes a device 210 to be tested coupled to a host computer 220 using a high-speed data transfer link 230. In some embodiments, high-speed data transfer link 230 may be a PCIe link. Device 210 may be a semiconductor device, an ASIC, an SoC, a computing device, and/or the like. Similar to device 110, device 210 may include a plurality of components (not shown) similar to components 116, which implement the functionality of device 210 and are to be tested. In some embodiments, these components may include logic gates, clocks, buses, and/or the like.

Device 210 is coupled to high-speed data transfer link 230 via a link interface 212. Link interface 212 couples one or more pins or pads on device 210 to which high-speed data transfer link 230 is connected to a link endpoint 214. In some embodiments and similar to the one or more I/O circuits 112, link interface 212 may include also include signal conditioning circuitry, drivers, and/or the like.

In some embodiments, each of the components on device 210 that sends and/or receives data via high-speed data transfer link 230 is associated with a corresponding link endpoint. As shown in FIG. 2, link endpoint 214 is the link endpoint for a test data transfer unit 216. In some embodiments, link endpoint 214 may be a PCIe endpoint. Link endpoint 214 is an interface between high-speed data transfer link 230 and test data transfer unit 216 that allows test data transfer unit 216 to receive commands and/or configuration information from other devices on high-speed data transfer link 230 (e.g., host computer 220), send status information to other devices on high-speed data transfer link 230, send and/or receive data on high-speed data transfer link 230, and/or the like.

Test data transfer unit 216 is a high-speed test data transfer unit that handles the testing of device 210. In some embodiments, test data transfer unit 216 receives commands and configuration information from host computer 220 regarding a test to be performed on device 210. The configuration information associated with the test includes an address, in memory of host computer 220, of test data associated with the test. In some embodiments, the configuration information may further include an amount of test data associated with the test, an address in the memory of host computer 220 where test results associated with the test are to be stored, and/or an identifier associated with the test. In some embodiments, test data transfer unit 216 may not receive the amount of test data associated with the test, the address where the test results are to be stored, and/or the identifier associated with the test directly from host computer 220, but may instead read the amount of test data associated with the test, the address where the test results are to be stored, and/or the identifier associated with the test from a header or other portion of the test data after test data transfer unit 216 begins to read the test data from the memory of host computer 220. In some embodiments, the configuration information may include clock configurations for configuring a speed and/or a phase of one or more of the clocks and/or clock control units on device 210. In such embodiments, test data transfer unit 216 uses the clock configuration to configure the one or more clocks and/or clock units. Once test data transfer unit 216 has received the configuration information associated with the test, test data transfer unit 216 receives a test start command from host computer 220 to begin the test. In some embodiments, the test start command may set a direct memory access (DMA) enable bit of test data transfer unit 216. In some embodiments, the commands may also include an instruction to reset device 210 before any of the configuration information and/or the test start command are received from host computer 220.

Once test data transfer unit 216 receives the command to begin the test of device 210, test data transfer unit 216 reads the test data from the memory of host computer 220 using the address of the test data provided by host computer 220. In some embodiments, test data transfer unit 216 read the data directly from the memory of host computer 220 via high-speed data transfer link 230 using DMA techniques. In some embodiments, test data transfer unit 216 includes a DMA controller or is a DMA controller customized for performing tests of device 210. As test data transfer unit 216 read the test data from the memory of host computer 220, test data transfer unit 216 sends the test data to test bus 218 so that the test data is distributed to the components of device 210. In some embodiments, test bus 218 is substantially similar to test bus 114. Once all of the test data associated with the test is read and distributed to test bus 218, test data transfer unit 216 begins the test, which causes device 216 to perform one or more operations using the test data. Test data transfer unit 216 then waits a suitable period of time for the test and the one or more operations to complete on device 210. Once at least a portion of the test is complete, test data transfer unit 216 retrieves the test results from test bus 218 and stores the test results found on test bus 218 to the address in the memory of host computer 220 provided in the configuration information using DMA techniques. After the test results are stored in the memory of host computer 220, test data transfer unit sends a notification to host computer 220 that the test is complete. In some embodiments, the notification may include an identifier of the test just completed.

By using high-speed data transfer link 230 to read the test data from the memory of host computer 220 and to store the test results in the memory of host computer 220 using DMA techniques, test data transfer unit 216 is able to significantly reduce the amount of time spent transferring test data and test results and thus significantly reduce the amount of time it takes to perform the test. For example, when high-speed data transfer link 230 is a PCIe link with a 16 lane Gen 3 configuration, the test data and test results may be transferred at a rate of 16 GBytes per second, which is two orders of magnitude faster than the ATE-based test environment 100 and reduces the time spent running the test by two orders of magnitude. In addition to the faster test data and test results data transfer speeds than testing solutions using an ATE, test data transfer unit 216 performs tests of device 210 without using an ATE and to perform tests, such as in-system tests that cannot be performed using an ATE.

In some embodiments, test data transfer unit 216 may also be configured to perform multiple tests based on the initial configuration information provided by host computer 220. In such embodiments, the header or another portion of the test data associated with a first test may include configuration information associated with a second test to be performed after the first test is complete. The configuration information associated with the second test may include an address in the memory of host computer 220 where the test data associated with the second test is read from, an amount of test data associated with the second test, an address in the memory of host computer 220 where the test results associated with the second test are to be stored, and/or an identifier associated with the second test. Thus, once the first test is complete and the test results associated with the first test are stored in the memory of host computer 220, test data transfer unit 216 can begin the second test. Additional tests may automatically be performed as long as the test data associated with one test includes the configuration information associated with a next test. In some embodiments, the test data associated with a last test may include an indication that there are no further tests. In some embodiments, test data transfer unit 216 may transmit a notification to host computer 220 after the test results associated with each test is stored in the memory of host computer 220 is completed and/or once all the test data associated with all the tests are stored in the memory of host computer 220. In some embodiments, the notification may include the identifier associated with the respective test.

In some embodiments, host computer 220 may be a desktop computer, a laptop computer, a smart phone, PDA, tablet computer, or any other type of computing device configured to receive input, process data, and optionally display images, and is suitable for practicing one or more embodiments. Host computer 220 is configured to run various programs and may use device 210 to perform various tasks. It is noted that host computer 220 as described herein is illustrative and that any other technically feasible configurations fall within the scope of the present disclosure.

As further shown in FIG. 2, host computer 220 includes one or more processors 222, memory 224, a link interface 226, and storage 228. Each of the one or more processors 222, memory 224, link interface 226, and/or storage 228 may be coupled together using one or more interconnects or buses, such as indicated by the various arrows showing connections between the one or more processors 222, memory 224, link interface 226, and/or storage 228. Each of the one or more processors 222 may be consistent with any suitable type processor including, without limitation, a CPU, a GPU, an ASIC, a FPGA, an AI accelerator, a microprocessor, a multi-core processor, a DSP, and/or the like. In some embodiments, the one or more processors 222 may include a combination of processors such as a CPU configured to operate in conjunction with a GPU. In general, each of the one or more processors 222 may be any technically feasible hardware unit capable of processing data and/or executing software applications. Further, in the context of this disclosure, the computing elements shown in host computer 220 may correspond to a physical computing system (e.g., a system in a data center or in an autonomous vehicle) or may be a virtual computing instance executing within a computing cloud or virtual machine.

Host computer 220 is coupled to high-speed data transfer link 230 via link interface 226. Link interface 226 couples one or more pins or pads on host computer 220 to which high-speed data transfer link 230 is connected to the one or more processors 222 and memory 224. In some embodiments, link interface 226 may also function as a primary controller for high-speed data transfer link 230. In some embodiments where high-speed data transfer link 230 is a PCIe link, link interface 226 may be a root complex for the PCIe link.

In some embodiments, storage 228 includes non-volatile storage for applications and data, and may include fixed or removable disk drives, flash memory devices, and CD-ROM, DVD-ROM, Blu-Ray, HD-DVD, or other magnetic, optical, or solid state storage devices. In some embodiments, software programs to be executed by the one or more processors 222 may be stored in storage 228 and loaded into memory 224 when executed. In some embodiments, storage 228 may also include test data and/or expected test results associated with one or more tests to be performed on device 210. And although not expressly shown, one or more portions of storage 228 may be located separated from host computer 220.

In some embodiments, memory 224 includes a random access memory (RAM) module, a flash memory unit, or any other type of memory unit or combination thereof. The one or more processors 222 are configured to read data from and write data to memory 224. Memory 224 may further include various software programs that can be executed by the one or more processors 222 and data associated with the software programs.

As shown in FIG. 2, memory 224 is storing a test program 242, test data 244, and test results 246. In operation, test program 242 coordinates the testing of device 210. To coordinate a test of device 210, test program 242 first allocates a first block of continuous data in memory 224 where test data 244 is to be stored. Once the block of memory for test data 244 is allocated, test program 242 stores the test data associated with the test (e.g., from storage 228) and stores the test data associated with the test in memory 224 as test data 244. Test program 242 then allocates a second block of contiguous data in memory 224 where test results 246 are to be stored. In some embodiments, test program 242 may further transmit one or more commands to an input/output memory management unit (IOMMU) (not shown) indicating that the blocks of memory allocated for test data 244 and/or test results 246 should be protected from paging and/or other actions that may alter the blocks of memory 224 while the test is being performed and to allow the blocks of memory to be used during DMA transfers.

Once the memory is allocated and the test data is stored as test data 244 in memory 224, test program 242 transmits commands and configuration information to test data transfer unit 216 regarding the test. In some embodiments, test program 242 transmits the commands and/or the configuration information to test data transfer unit 216 using high-speed data transfer link 230. In such embodiments, in order to use high-speed data transfer link 230, test program 242 may perform one or more discovery operations on high-speed data transfer link 230 using link interface 226 in order to identify and begin communication with link endpoint 214. As discussed above, the configuration information includes an address (e.g., a physical address) of the block of memory 224 where test data 244 is located, an amount of data in test data 244, an address (e.g., a physical address) of the block of memory 224 where test results 246 is located, and/or an identifier associated with the test. As a minimum, test program 242 transmits the address of the block of memory 224 where test data 244 is located to test data transfer unit 216. However, the amount of data in test data 244, the address of the block of memory 224 where test results 246 is located, and/or the identifier associated with the test may be either transmitted directly to test data transfer unit 216 or stored in a header or other portion of test data 244. In some embodiments, test program 242 may transmit clock configurations to test data transfer unit 216. In some embodiments, test program 242 may transmit a command to reset device 210 before transmitting the confirmation information or other commands associated with the test.

After the test data is stored to memory 224 as test data 244 and the configuration information associated with the test (e.g., at least the address of the block of memory 224 where test data 244 is stored), test program transmits a test start command to test data transfer unit 216. Once the test start command is transmitted, test program 242 waits for test data transfer unit 216 to indicate that the test is completed, and the test results are stored to the block of memory 224 where test results 246 is located. Because host computer 220 does not have to supervise the test, host computer 220 is able to perform other tasks while the test is being performed.

Once the test is complete and the test results are stored in the block of memory where test results 246 is located, test program 242 receives the notification that the test is complete from test data transfer unit 216, such as via an interrupt, a callback, and/or the like. In some embodiments, test program 242 may know which test is complete based on an identifier associated with the test included in the notification. Upon receiving the notification, test program 242 may store test results 246 in storage 228 and/or pass test results 246 to another testing program. Once test results 246 is stored and/or passed on, test program 242 may deallocate the blocks of memory for test data 244 and/or test results 246 and/or reuse those blocks for additional tests.

In some embodiments, test program 242 may also be used to have test data transfer unit 216 perform multiple tests. In such embodiments, test program 242 may allocate blocks of memory 224 for the test data and the test results associated with each test. Test program 242 may then include the configuration information associated with a next test in the test data test program 242 reads to the corresponding block of memory 224 of a previous test so that as test data transfer unit 216 reads the test data associated with the previous test, test data transfer unit 216 also receives the configuration information associated with the next test.

As discussed above and further emphasized here, FIG. 2 is merely an example which should not unduly limit the scope of the claims. Although not expressly shown in FIG. 2, device 210 may additionally be equipped with one or more I/O circuits similar to the one or more I/O circuits 112 allowing device 210 to be tested using an ATE, such as ATE 130. In some embodiments, test program 242 may use other connections (not shown) between host computer 220 and device 210 to transmit the commands to test data transfer unit 216, to transmit the configuration information to test data transfer unit 216, and/or the receive the notification from test data transfer unit 216 that a test or tests are complete.

In some embodiments, test program 242 may allocate the blocks of memory for test data 244 and/or test results 246 using multiple sub-blocks that are individually contiguous. In such embodiments, the sub-blocks may be organized in a linked-list fashion so that test data transfer unit 216 reads each sub-block one at a time and uses an address stored in the header or other portion of the sub-block to learn where the next sub-block is located until a last sub-block indicates that there are no further sub-blocks. Use of the linked-list arrangement allows test data 244 and/or test results 246 to be stored in non-contiguous regions of memory 224.

Techniques for Testing Semiconductor Devices

Figure 3:
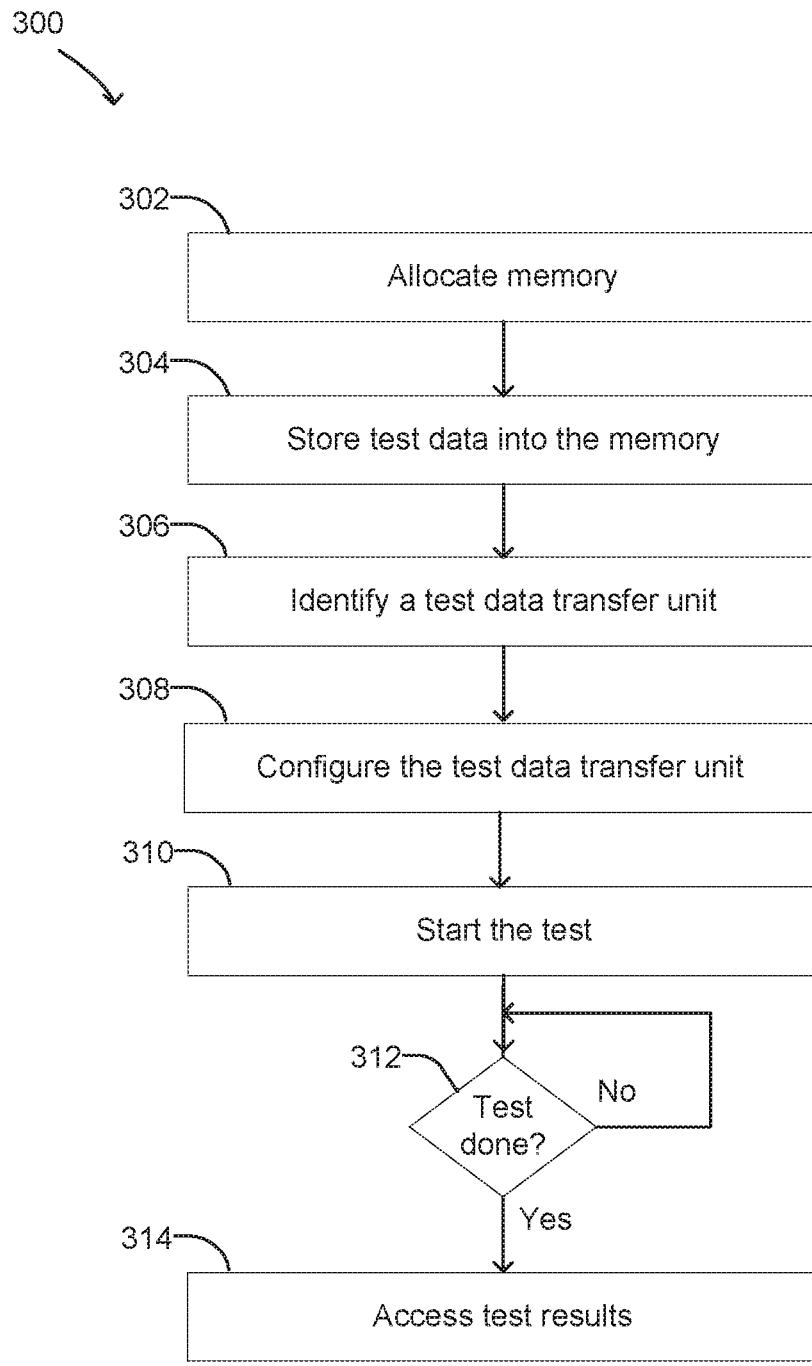
FIG. 3 is a flow chart of method steps for coordinating one or more tests on a semiconductor device, according to various embodiments.

FIG. 3 is a flow chart of method steps for coordinating one or more tests on a semiconductor device, according to various embodiments. In some embodiments, the method steps of FIG. 3 may be performed by host computer 220. Although the method steps are described in conjunction with the systems of FIG. 2, persons skilled in the art will understand that any system configured to perform the method steps in any order falls within the scope of the present disclosure.

As shown in FIG. 3, a method 300 begins at a step 302 where test program allocates memory. Test program 242 first allocates a first block of continuous data in memory 224 where test data 244 associated with a test of device 210 is to be stored. Test program 242 further allocates a second block of memory in memory 224 where test results 246 associated with the test are to be stored. In some embodiments, test program 242 may further transmit one or more commands to an IOMMU indicating that the blocks of memory allocated for test data 244 and/or test results 246 should be protected and to allow the blocks of memory to be used during DMA transfers. At a step 304, test program 242, stores the test data associated with the test (e.g., from storage 228) and stores the test data associated with the test in memory 224 as test data 244.

At a step 306, test program 242 identifies a test data transfer unit to perform the test. In some embodiments, test program 242 may perform one or more discovery operations on high-speed data transfer link 230 using link interface 226 in order to identify and begin communication with link endpoint 214 for test data transfer unit 216.

At a step 308, test program 242 configures test data transfer unit 216. At a minimum, test program 242 transmits an address of the block of memory 224 where test data 244 is stored to test data transfer unit 216. In some embodiments, test program 242 may transmit an amount of data in test data 244, the address of the block of memory 224 where test results 246 is located, and/or the identifier associated with the test to test data transfer unit 216. In some embodiments, test program 242 may store the address of the block of memory 224 where test results 246 is located, and/or the identifier associated with the test to test data transfer unit 216 information in a header or other portion of test data 244. In some embodiments, test program 242 may transmit clock configurations to test data transfer unit 216. In some embodiments, test program 242 may transmit a command to reset device 210 before transmitting the confirmation information or other commands associated with the test to test data transfer unit 216.

At a step 310, test program 242 starts the test by transmitting a test start command to test data transfer unit 216. Once the test start command is transmitted, test program 242 then waits for test data transfer unit 216 to notify test program 342 that the test is done during a step 312. In some embodiments, test program 342 may receive the notification via an interrupt, a callback, and/or the like. While test program 242 is waiting for the notification from test data transfer unit 216, host computer 220 may be used to perform other tasks. When test program 242 receives the notification that the test is done, method 300 proceeds to a step 314.

At step 314, test program 242 accesses test results 246 from memory 224 where test data transfer unit 216 stored test results 246. In some embodiments, test program 242 may store test results 246 in storage 228 and/or pass test results 246 to another testing program. Once step 314 is complete, test program 242 may exit and/or return to step 302 and/or 304 to coordinate another test.

In some embodiments, method 300 may be adapted to allow test program 242 to coordinate multiple tests at one time. In such embodiments, test program 242 may allocate blocks of memory 224 for the test data and the test results associated with each test using a respective step 302. Test program 242 then stores the test data associated with each test in a respective test data block using a respective step 304. Test program 242 may then include the configuration information associated with a next test in the test data test program 242 stores to the respective test data associated with the previous block. Steps 306 through 310 may then be used to configure and start the first test. Step 314 is then performed each time test data transfer unit 216 transmits a notification to test program 242 that a test is complete and test results are available.

Figure 4:
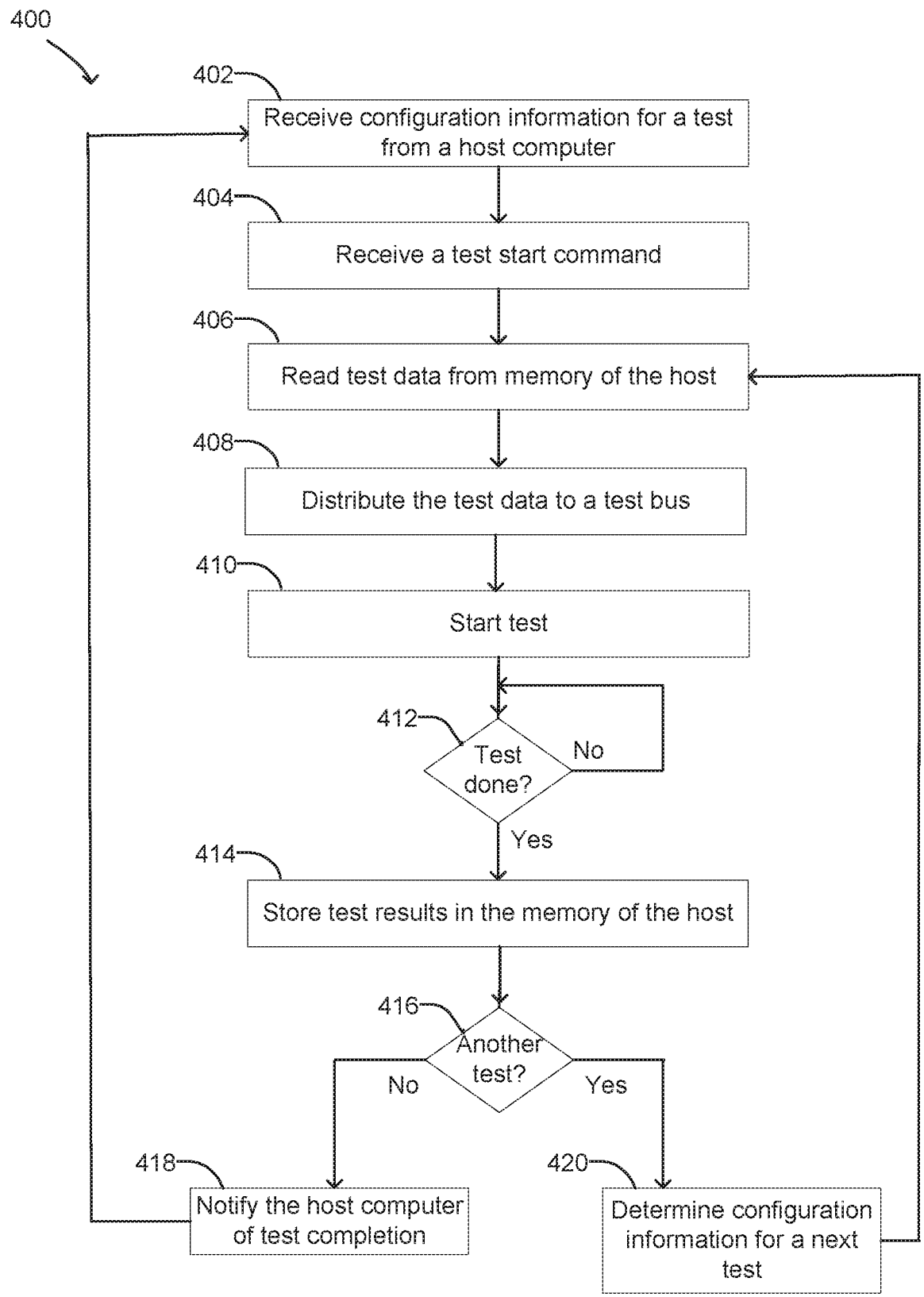
FIG. 4 is a flow chart of method steps for performing one or more tests on a semiconductor device, according to various embodiments.

FIG. 4 is a flow chart of method steps for performing 216 to perform one or more tests, according to various embodiments. In some embodiments, the method steps of FIG. 4 may be performed by test data transfer unit 216. Although the method steps are described in conjunction with the systems of FIG. 2, persons skilled in the art will understand that any system configured to perform the method steps in any order falls within the scope of the present disclosure.

As shown in FIG. 4, a method 400 begins at a step 402 where test data transfer unit 216 receives configuration information associated with a test from host computer 220 (e.g., from test program 242). As a minimum, the configuration information includes an address of a location in memory 224 where test data 244 is located. In some embodiments, an amount of test data associated with the test, an address in the memory of host computer 220 where test results 246 are located, and/or an identifier associated with the test may be received from test program 242 and/or alternatively read from a header or other portion of test data 244 during step 406. In some embodiments, the configuration information may further include clock configurations for configuring a speed and/or a phase of one or more of the clocks and/or clock control units on device 210. In such embodiments, test data transfer unit 216 uses the clock configuration to configure the one or more clocks and/or clock units. In some embodiments, an instruction to reset device 210 may be received from test program 242 before any of the configuration information during step 402.

At a step 404, test data transfer unit 216 receives a test start command from test program 242. Once test data transfer unit 216 has received the command to begin the test of device 210, test data transfer unit 216 reads the test data from the memory of host computer 220 using step 406. In some embodiments, test data transfer unit 216 reads the data directly from memory 224 of host computer 220 beginning at the address of test data 244 received during step 402. Test data transfer unit 216 reads the test data via high-speed data transfer link 230 using DMA techniques. As the test data is read during step 406, the test data is distributed to test bus 218 by test data transfer unit 216 during a step 408.

At a step 410, test data transfer unit 216 starts the test on device 210, which causes device 210 to perform one or more operations using the test data. Test data transfer unit 216 the waits for at least a portion the test and the one or more operations to finish using a step 412. In some embodiments, test data transfer unit 216 may use a timer or delay to allow sufficient time to allow device 210 to complete the test and for test results to be available on test bus 218. Once the test is done, method 400 continues with a step 414.

At step 414, test data transfer unit 216 stores the test results found on test bus 218 to the address of test results 246 in memory 224 of host computer 220 provided in the configuration information. Test data transfer unit 316 stores the test results directly to test results 246 via high-speed data transfer link 230 using DMA techniques.

At a step 416, test data transfer unit 216 determines whether there is another test to perform. In some embodiments, test data transfer unit 216 determines whether there is another test to perform when test data transfer unit 216 detects configuration information associated with another test in the test data read during step 406.

When test data transfer unit 216 determines that there are no further tests during step 416, test data transfer unit notifies host computer (e.g., test program 242) that the test is complete during a step 418. In some embodiments, the notification may include the identifier associated with the test found in the received configuration information. Upon completing step 418, method 400 repeats by returning to step 402.

When test data transfer unit 216 determines that there are further tests during step 416, test data transfer unit 216 determines the configuration information associated with the next test from the test data read during step 406 and returns to step 406 to read the test data associated with the new test.

Exemplary Hardware Architecture

Figure 5:
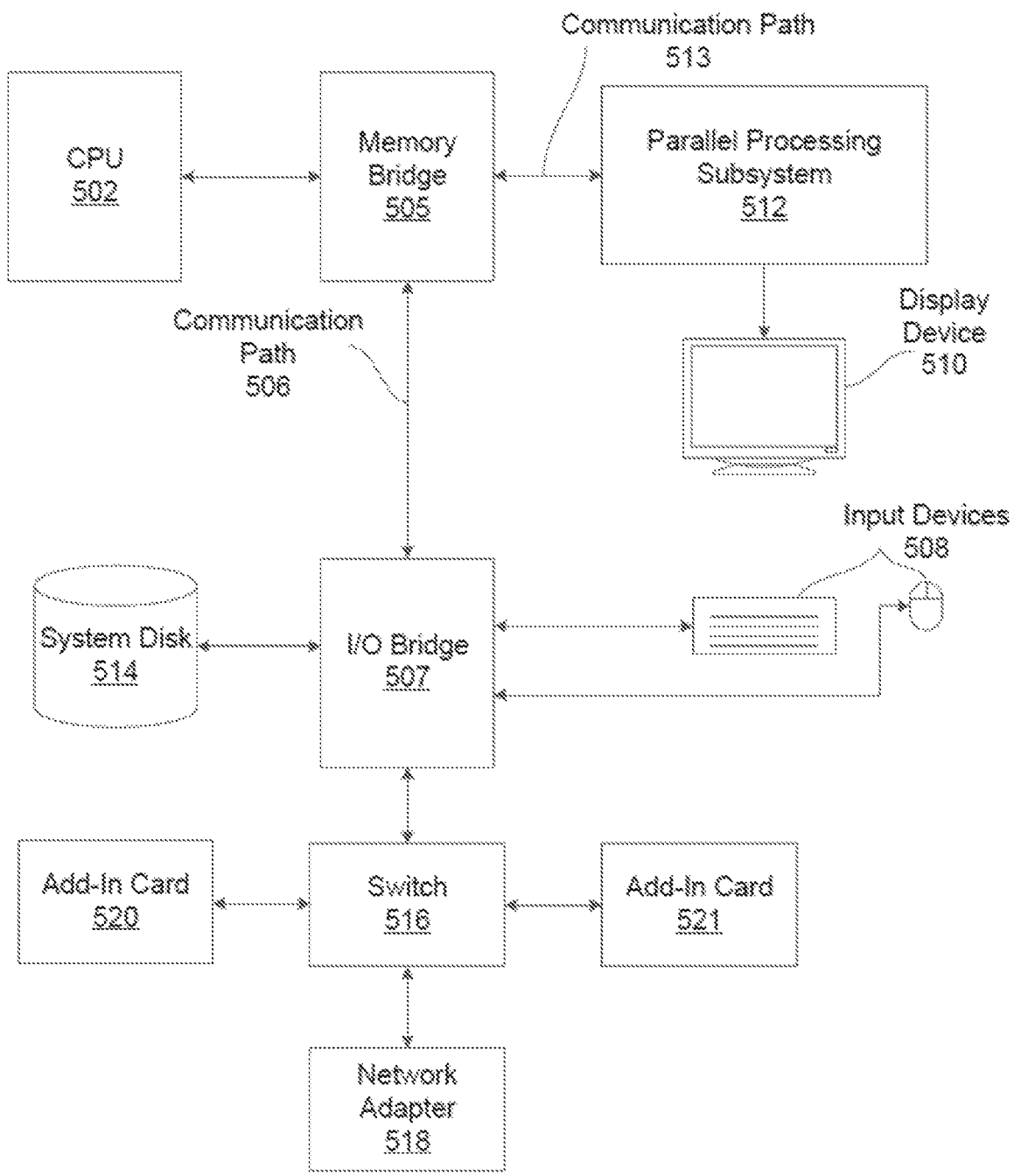
FIG. 5 is a block diagram illustrating a computer system configured to implement one or more aspects of the present embodiments.

FIG. 5 is a block diagram illustrating a computer system 500 configured to implement one or more aspects of the present embodiments. In some embodiments, computer system 500 is a server machine operating in a data center or a cloud computing environment that provides scalable computing resources as a service over a network. In some embodiments, computer system 500 may be representative of all or portions of device 110, device 210, host computer 120, and/or host computer 220.

In various embodiments, computer system 500 includes, without limitation, a central processing unit (CPU) 502 and a system memory (not shown) coupled to a parallel processing subsystem 512 via a memory bridge 505 and a communication path 513. Memory bridge 505 is further coupled to an I/O (input/output) bridge 507 via a communication path 506, and I/O bridge 507 is, in turn, coupled to a switch 516.

In one embodiment, I/O bridge 507 is configured to receive user input information from optional input devices 508, such as a keyboard or a mouse, and forward the input information to CPU 502 for processing via communication path 506 and memory bridge 505. In some embodiments, computer system 500 may be a server machine in a cloud computing environment. In such embodiments, computer system 500 may not have input devices 508. Instead, computer system 500 may receive equivalent input information by receiving commands in the form of messages transmitted over a network and received via the network adapter 518. In one embodiment, switch 516 is configured to provide connections between I/O bridge 507 and other components of the computer system 500, such as a network adapter 518 and various add-in cards 520 and 521.

In one embodiment, I/O bridge 507 is coupled to a system disk 514 that may be configured to store content and applications and data for use by CPU 502 and parallel processing subsystem 512. In one embodiment, system disk 514 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices. In various embodiments, other components, such as universal serial bus or other port connections, compact disc drives, digital versatile disc drives, film recording devices, and the like, may be connected to I/O bridge 507 as well.

In various embodiments, memory bridge 505 may be a Northbridge chip, and I/O bridge 507 may be a Southbridge chip. In addition, communication paths 506 and 513, as well as other communication paths within computer system 500, may be implemented using any technically suitable protocols, including, without limitation, AGP (Accelerated Graphics Port), HyperTransport, or any other bus or point-to-point communication protocol known in the art.

In some embodiments, parallel processing subsystem 512 comprises a graphics subsystem that delivers pixels to an optional display device 510 that may be any conventional cathode ray tube, liquid crystal display, light-emitting diode display, or the like. In such embodiments, the parallel processing subsystem 512 incorporates circuitry optimized for graphics and video processing, including, for example, video output circuitry. As described in greater detail below in conjunction with FIGS. 8 and 9, such circuitry may be incorporated across one or more parallel processing units (PPUs), also referred to herein as parallel processors, included within parallel processing subsystem 512. In other embodiments, the parallel processing subsystem 512 incorporates circuitry optimized for general purpose and/or compute processing. Again, such circuitry may be incorporated across one or more PPUs included within parallel processing subsystem 512 that are configured to perform such general purpose and/or compute operations. In yet other embodiments, the one or more PPUs included within parallel processing subsystem 512 may be configured to perform graphics processing, general purpose processing, and compute processing operations. System memory includes at least one device driver configured to manage the processing operations of the one or more PPUs within parallel processing subsystem 512.

In various embodiments, parallel processing subsystem 512 may be integrated with one or more of the other elements of FIG. 5 to form a single system. For example, parallel processing subsystem 512 may be integrated with CPU 502 and other connection circuitry on a single chip to form a system on chip (SoC).

In one embodiment, CPU 502 is the master processor of computer system 500, controlling and coordinating operations of other system components. In one embodiment, CPU 502 issues commands that control the operation of PPUs. In some embodiments, communication path 513 is a PCI Express link, in which dedicated lanes are allocated to each PPU, as is known in the art. Other communication paths may also be used. PPU advantageously implements a highly parallel processing architecture. A PPU may be provided with any amount of local parallel processing memory (PP memory).

It will be appreciated that the system shown herein is illustrative and that variations and modifications are possible. The connection topology, including the number and arrangement of bridges, the number of CPUs 502, and the number of parallel processing subsystems 512, may be modified as desired. For example, in some embodiments, system memory could be connected to CPU 502 directly rather than through memory bridge 505, and other devices would communicate with system memory via memory bridge 505 and CPU 502. In other embodiments, parallel processing subsystem 512 may be connected to I/O bridge 507 or directly to CPU 502, rather than to memory bridge 505. In still other embodiments, I/O bridge 507 and memory bridge 505 may be integrated into a single chip instead of existing as one or more discrete devices. Lastly, in certain embodiments, one or more components shown in FIG. 5 may not be present. For example, switch 516 could be eliminated, and network adapter 518 and add-in cards 520, 521 would connect directly to I/O bridge 507.

Figure 6:
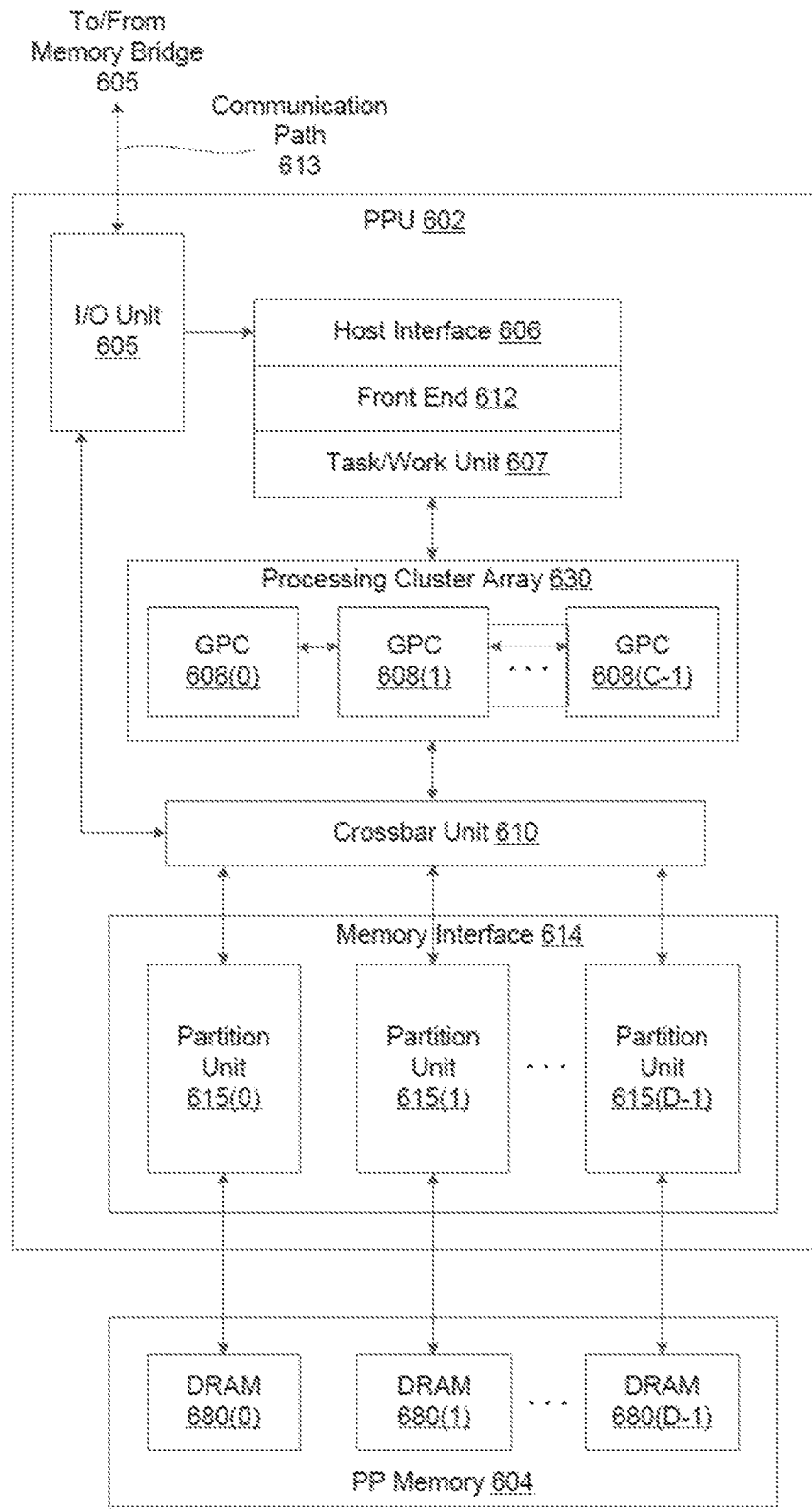
FIG. 6 is a block diagram of a parallel processing unit included in the parallel processing subsystem of FIG. 5, according to various embodiments.

FIG. 6 is a block diagram of a parallel processing unit (PPU) 602 included in the parallel processing subsystem 512 of FIG. 5, according to various embodiments. Although FIG. 6 depicts one PPU 602, as indicated above, parallel processing subsystem 512 may include any number of PPUs 602. As shown, PPU 602 is coupled to a local parallel processing (PP) memory 604. PPU 602 and PP memory 604 may be implemented using one or more integrated circuit devices, such as programmable processors, application specific integrated circuits (ASICs), or memory devices, or in any other technically feasible fashion.

In some embodiments, PPU 602 comprises a graphics processing unit (GPU) that may be configured to implement a graphics rendering pipeline to perform various operations related to generating pixel data based on graphics data supplied by CPU 502 and/or system memory. When processing graphics data, PP memory 604 can be used as graphics memory that stores one or more conventional frame buffers and, if needed, one or more other render targets as well. Among other things, PP memory 604 may be used to store and update pixel data and deliver final pixel data or display frames to an optional display device 510 for display.

In some embodiments, PPU 602 also may be configured for general-purpose processing and compute operations. In some embodiments, computer system 500 may be a server machine in a cloud computing environment. In such embodiments, computer system 500 may not have a display device 510. Instead, computer system 500 may generate equivalent output information by transmitting commands in the form of messages over a network via the network adapter 518.

In some embodiments, CPU 502 is the master processor of computer system 500, controlling and coordinating operations of other system components. In one embodiment, CPU 502 issues commands that control the operation of PPU 602. In some embodiments, CPU 502 writes a stream of commands for PPU 602 to a data structure (not explicitly shown in either FIG. 5 or FIG. 6) that may be located in system memory, PP memory 604, or another storage location accessible to both CPU 502 and PPU 602. A pointer to the data structure is written to a command queue, also referred to herein as a pushbuffer, to initiate processing of the stream of commands in the data structure. In one embodiment, the PPU 602 reads command streams from the command queue and then executes commands asynchronously relative to the operation of CPU 502. In embodiments where multiple pushbuffers are generated, execution priorities may be specified for each pushbuffer by an application program via device driver to control scheduling of the different pushbuffers.

In one embodiment, PPU 602 includes an I/O (input/output) unit 605 that communicates with the rest of computer system 500 via the communication path 513 and memory bridge 505. In one embodiment, I/O unit 605 generates packets (or other signals) for transmission on communication path 513 and also receives all incoming packets (or other signals) from communication path 513, directing the incoming packets to appropriate components of PPU 602. For example, commands related to processing tasks may be directed to a host interface 606, while commands related to memory operations (e.g., reading from or writing to PP memory 604) may be directed to a crossbar unit 610. In one embodiment, host interface 606 reads each command queue and transmits the command stream stored in the command queue to a front end 612.

As mentioned above in conjunction with FIG. 5, the connection of PPU 602 to the rest of computer system 500 may be varied. In some embodiments, parallel processing subsystem 512, which includes at least one PPU 602, is implemented as an add-in card that can be inserted into an expansion slot of computer system 500. In other embodiments, PPU 602 can be integrated on a single chip with a bus bridge, such as memory bridge 505 or I/O bridge 507. Again, in still other embodiments, some or all of the elements of PPU 602 may be included along with CPU 502 in a single integrated circuit or system of chip (SoC).

In one embodiment, front end 612 transmits processing tasks received from host interface 606 to a work distribution unit (not shown) within task/work unit 607. In one embodiment, the work distribution unit receives pointers to processing tasks that are encoded as task metadata (TMD) and stored in memory. The pointers to TMDs are included in a command stream that is stored as a command queue and received by the front end unit 612 from the host interface 606. Processing tasks that may be encoded as TMDs include indices associated with the data to be processed as well as state parameters and commands that define how the data is to be processed. For example, the state parameters and commands could define the program to be executed on the data. Also for example, the TMD could specify the number and configuration of the set of CTAs. Generally, each TMD corresponds to one task. The task/work unit 607 receives tasks from the front end 612 and ensures that GPCs 608 are configured to a valid state before the processing task specified by each one of the TMDs is initiated. A priority may be specified for each TMD that is used to schedule the execution of the processing task. Processing tasks also may be received from the processing cluster array 630. Optionally, the TMD may include a parameter that controls whether the TMD is added to the head or the tail of a list of processing tasks (or to a list of pointers to the processing tasks), thereby providing another level of control over execution priority.

In one embodiment, PPU 602 implements a highly parallel processing architecture based on a processing cluster array 630 that includes a set of C general processing clusters (GPCs) 608, where C≥1. Each GPC 608 is capable of executing a large number (e.g., hundreds or thousands) of threads concurrently, where each thread is an instance of a program. In various applications, different GPCs 608 may be allocated for processing different types of programs or for performing different types of computations. The allocation of GPCs 608 may vary depending on the workload arising for each type of program or computation.

In one embodiment, memory interface 614 includes a set of D of partition units 615, where D≥1. Each partition unit 615 is coupled to one or more dynamic random access memories (DRAMs) 620 residing within PPM memory 604. In some embodiments, the number of partition units 615 equals the number of DRAMs 620, and each partition unit 615 is coupled to a different DRAM 620. In other embodiments, the number of partition units 615 may be different than the number of DRAMs 620. Persons of ordinary skill in the art will appreciate that a DRAM 620 may be replaced with any other technically suitable storage device. In operation, various render targets, such as texture maps and frame buffers, may be stored across DRAMs 620, allowing partition units 615 to write portions of each render target in parallel to efficiently use the available bandwidth of PP memory 604.

In one embodiment, a given GPC 608 may process data to be written to any of the DRAMs 620 within PP memory 604. In one embodiment, crossbar unit 610 is configured to route the output of each GPC 608 to the input of any partition unit 615 or to any other GPC 608 for further processing. GPCs 608 communicate with memory interface 614 via crossbar unit 610 to read from or write to various DRAMs 620. In some embodiments, crossbar unit 610 has a connection to I/O unit 605, in addition to a connection to PP memory 604 via memory interface 614, thereby enabling the processing cores within the different GPCs 608 to communicate with system memory or other memory not local to PPU 602. In the embodiment of FIG. 6, crossbar unit 610 is directly connected with I/O unit 605. In various embodiments, crossbar unit 610 may use virtual channels to separate traffic streams between the GPCs 608 and partition units 615.

In one embodiment, GPCs 608 can be programmed to execute processing tasks relating to a wide variety of applications, including, without limitation, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel/fragment shader programs), general compute operations, etc. In operation, PPU 602 is configured to transfer data from system memory and/or PP memory 604 to one or more on-chip memory units, process the data, and write result data back to system memory and/or PP memory 604. The result data may then be accessed by other system components, including CPU 502, another PPU 602 within parallel processing subsystem 512, or another parallel processing subsystem 512 within computer system 500.

In one embodiment, any number of PPUs 602 may be included in a parallel processing subsystem 512. For example, multiple PPUs 602 may be provided on a single add-in card, or multiple add-in cards may be connected to communication path 513, or one or more of PPUs 602 may be integrated into a bridge chip. PPUs 602 in a multi-PPU system may be identical to or different from one another. For example, different PPUs 602 might have different numbers of processing cores and/or different amounts of PP memory 604. In implementations where multiple PPUs 602 are present, those PPUs may be operated in parallel to process data at a higher throughput than is possible with a single PPU 602. Systems incorporating one or more PPUs 602 may be implemented in a variety of configurations and form factors, including, without limitation, desktops, laptops, handheld personal computers or other handheld devices, servers, workstations, game consoles, embedded systems, and the like.

Figure 7:
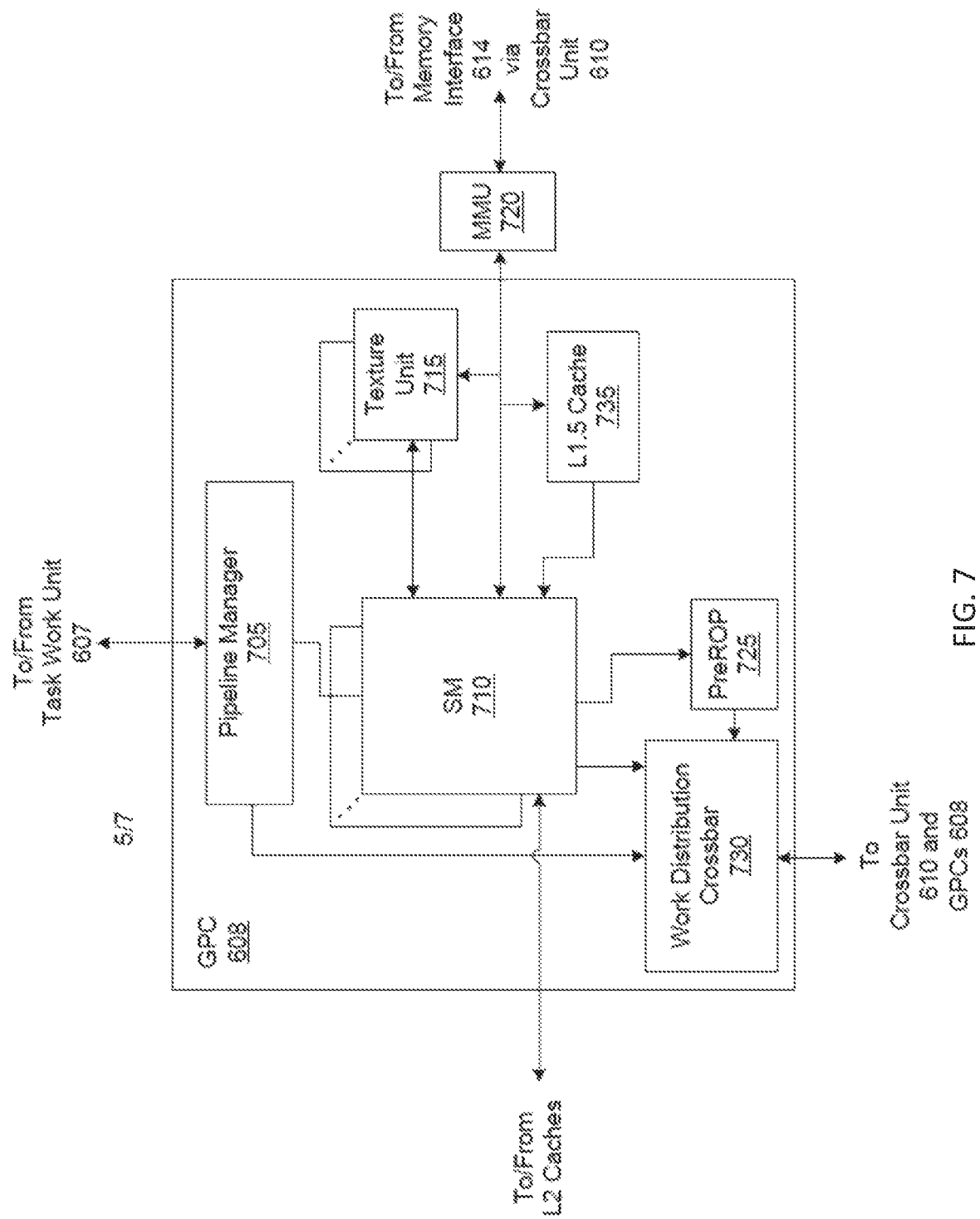
FIG. 7 is a block diagram of a general processing cluster included in the parallel processing unit of FIG. 6, according to various embodiments.

FIG. 7 is a block diagram of a general processing cluster (GPC) 608 included in the parallel processing unit (PPU) 602 of FIG. 6, according to various embodiments. As shown, the GPC 608 includes, without limitation, a pipeline manager 705, one or more texture units 715, a preROP unit 725, a work distribution crossbar 730, and an L1.5 cache 735.

In one embodiment, GPC 608 may be configured to execute a large number of threads in parallel to perform graphics, general processing and/or compute operations. As used herein, a "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within GPC 608. Unlike a SIMD execution regime, where all processing engines typically execute identical instructions, SIMT execution allows different threads to more readily follow divergent execution paths through a given program. Persons of ordinary skill in the art will understand that a SIMD processing regime represents a functional subset of a SIMT processing regime.

In one embodiment, operation of GPC 608 is controlled via a pipeline manager 705 that distributes processing tasks received from a work distribution unit (not shown) within task/work unit 607 to one or more streaming multiprocessors (SMs) 710. Pipeline manager 705 may also be configured to control a work distribution crossbar 730 by specifying destinations for processed data output by SMs 710.

In various embodiments, GPC 608 includes a set of M of SMs 710, where M≥1. Also, each SM 710 includes a set of functional execution units (not shown), such as execution units and load-store units. Processing operations specific to any of the functional execution units may be pipelined, which enables a new instruction to be issued for execution before a previous instruction has completed execution. Any combination of functional execution units within a given SM 710 may be provided. In various embodiments, the functional execution units may be configured to support a variety of different operations including integer and floating point arithmetic (e.g., addition and multiplication), comparison operations, Boolean operations (AND, OR, 5OR), bit-shifting, and computation of various algebraic functions (e.g., planar interpolation and trigonometric, exponential, and logarithmic functions, etc.). Advantageously, the same functional execution unit can be configured to perform different operations.

In one embodiment, each SM 710 is configured to process one or more thread groups. As used herein, a "thread group" or "warp" refers to a group of threads concurrently executing the same program on different input data, with one thread of the group being assigned to a different execution unit within an SM 710. A thread group may include fewer threads than the number of execution units within the SM 710, in which case some of the execution may be idle during cycles when that thread group is being processed. A thread group may also include more threads than the number of execution units within the SM 710, in which case processing may occur over consecutive clock cycles. Since each SM 710 can support up to G thread groups concurrently, it follows that up to G*M thread groups can be executing in GPC 608 at any given time.

Additionally, in one embodiment, a plurality of related thread groups may be active (in different phases of execution) at the same time within an SM 710. This collection of thread groups is referred to herein as a "cooperative thread array" ("CTA") or "thread array." The size of a particular CTA is equal to m*k, where k is the number of concurrently executing threads in a thread group, which is typically an integer multiple of the number of execution units within the SM 710, and m is the number of thread groups simultaneously active within the SM 710. In some embodiments, a single SM 710 may simultaneously support multiple CTAs, where such CTAs are at the granularity at which work is distributed to the SMs 710.

In one embodiment, each SM 710 contains a level one (L1) cache or uses space in a corresponding L1 cache outside of the SM 710 to support, among other things, load and store operations performed by the execution units. Each SM 710 also has access to level two (L2) caches (not shown) that are shared among all GPCs 608 in PPU 602. The L2 caches may be used to transfer data between threads. Finally, SMs 710 also have access to off-chip "global" memory, which may include PP memory 604 and/or system memory. It is to be understood that any memory external to PPU 602 may be used as global memory. Additionally, as shown in FIG. 7, a level one-point-five (L1.5) cache 735 may be included within GPC 608 and configured to receive and hold data requested from memory via memory interface 614 by SM 710. Such data may include, without limitation, instructions, uniform data, and constant data. In embodiments having multiple SMs 710 within GPC 608, the SMs 710 may beneficially share common instructions and data cached in L1.5 cache 735.

In one embodiment, each GPC 608 may have an associated memory management unit (MMU) 720 that is configured to map virtual addresses into physical addresses. In various embodiments, MMU 720 may reside either within GPC 608 or within the memory interface 614. The MMU 720 includes a set of page table entries (PTEs) used to map a virtual address to a physical address of a tile or memory page and optionally a cache line index. The MMU 720 may include address translation lookaside buffers (TLB) or caches that may reside within SMs 710, within one or more L1 caches, or within GPC 608.

In one embodiment, in graphics and compute applications, GPC 608 may be configured such that each SM 710 is coupled to a texture unit 715 for performing texture mapping operations, such as determining texture sample positions, reading texture data, and filtering texture data.

In one embodiment, each SM 710 transmits a processed task to work distribution crossbar 730 in order to provide the processed task to another GPC 608 for further processing or to store the processed task in an L2 cache (not shown), parallel processing memory 604, or system memory via crossbar unit 610. In addition, a pre-raster operations (preROP) unit 725 is configured to receive data from SM 710, direct data to one or more raster operations (ROP) units within partition units 615, perform optimizations for color blending, organize pixel color data, and perform address translations.

It will be appreciated that the architecture described herein is illustrative and that variations and modifications are possible. Among other things, any number of processing units, such as SMs 710, texture units 715, or preROP units 725, may be included within GPC 608. Further, as described above in conjunction with FIG. 6, PPU 602 may include any number of GPCs 608 that are configured to be functionally similar to one another so that execution behavior does not depend on which GPC 608 receives a particular processing task. Further, each GPC 608 operates independently of the other GPCs 608 in PPU 602 to execute tasks for one or more application programs.

In sum, techniques for testing semiconductor devices include a host computer coupled to a device to be tested using a high-speed data transfer link. A test program on the host computer allocates a first block of memory for storing test data associated with a test of the device and a second block of memory for storing test results associated with the test. The test program then stores the test data into the first block. The test program then transmits configuration information including at least an address of the first block to a test data transfer unit on the device. The test program may then either transmit or store in the test data at least of an amount of test data, an address of the second block, or an identifier associated with the test. The test program then sends a test start command to the test data transfer unit and then becomes idle. In response to receiving the test start command, the test data transfer unit loads the test data from the first block of memory via a high-speed data transfer link using direct memory access. As the test data transfer unit receives the test data, the test data transfer unit sends the test data to the components of the device using a test bus of the device. After all the test data is loaded and distributed, the test data transfer unit begins the test of the device, which causes the components to perform one or more operations using the test data to perform at least a portion of the test. After the operations complete, the test data transfer unit loads test results of the at least a portion of the test from the test bus and stores the test results to the second block of memory via the high-speed data transfer link using direct memory access. After the test results are stored, the test data transfer unit transmits a notification to the test program that the test is complete. In response to receiving the notification, the test program processes the test results stored in the second block. In some embodiments, the techniques may further include the test program including configuration information associated with a second test in the test data and the test data transfer unit using the configuration information associated with the second test to automatically perform the second test after completing the test.

One technical advantage of the disclosed techniques relative to the prior art is that the data transfer rate for transferring test data into a semiconductor device and transferring test results out of the semiconductor device can be substantially increased thereby reducing overall test time for the semiconductor device. Another technical advantage is that the disclosed techniques allow testing to be performed on a semiconductor device using the existing high-speed link present within the semiconductor device, which enables testing to be performed after the semiconductor device has deployed in a final system. Thus, the disclosed techniques enable system-level testing under environmental conditions typically experienced by the semiconductor device during actual operation and enable system-level testing in the field, such as the system-level testing required under ISO26262 for automotive systems. Additionally, the disclosed techniques enable semiconductor devices to be tested without the use of specialized automated test equipment. These technical advantages provide one or more technological improvements over prior art approaches.

1. In some embodiments, a method for testing a semiconductor device comprises receiving, from a computer, instructions for performing a first test on the semiconductor device; reading, via a high-speed data transfer connection, test data associated with the first test from a memory of the computer; distributing the test data to one more components of the semiconductor device; causing one or more operations to be performed on the semiconductor device to implement at least a portion of the first test; and after the one or more operations have completed, storing, via the high-speed data transfer connection, test results related to the at least a portion of the first test in the memory of the computer.

2. The method according to clause 1, further comprising, after storing the test results, notifying the computer that the test is complete.

3. The method according to clause 1 or clause 2, wherein the instructions for performing the test include an address in the memory of the computer where the test data is stored.

4. The method according to any of clauses 1-3, wherein the instructions comprise at least one of an amount of test data, an address in the memory of the computer where the test results are to be stored, or an identifier of the test.

5. The method according to any of clauses 1-4, wherein the test data comprises at least one of an amount of test data, an address in the memory of the computer where the test results are to be stored, or an identifier of the test.

6. The method according to any of clauses 1-4, further comprising: determining, by the test data transfer unit, instructions for a second test of the semiconductor device based on information included in the test data for the test; reading, via the high-speed data transfer connection, test data for the second test from memory of the computer; distributing, by the test data transfer unit, the test data for the second test to the one or more components of the semiconductor device; causing one or more operations to be performed on the semiconductor device to perform at least a portion of the second test; and after the one or more operations have completed, storing, unit via the high-speed data transfer connection, test results related to that at least a portion of the second test in the memory of the computer.

7. In some embodiments, a semiconductor device comprises a plurality of components; a test bus; and a test data transfer unit. The test data transfer unit receives, from a host computer, configuration information for performing a test of the semiconductor device; reads, via a high-speed data transfer link, test data associated with the test from memory of the host computer using direct memory access; sends the test data to the plurality of components via the test bus; causes one or more operations to be performed on the semiconductor device to effect at least a portion of the test; and after the one or more operations have completed, retrieves test results of the at least a portion of the test from the test bus and stores, via the high-speed data transfer link, the test results in the memory of the host computer using direct memory access.

8. The semiconductor device according to clause 7, wherein the high-speed data transfer link comprises a peripheral component interface express (PCIe) link.

9. The semiconductor device according to clause 7 or clause 8, wherein after storing the test results, the test data transfer unit sends a notification to the host computer that the test is complete.

10. The semiconductor device according to any of clauses 7-9, wherein the notification includes an identifier for the test.

11. The semiconductor device according to any of clauses 7-10, wherein the configuration information comprises an address in the memory of the host computer where the test data is stored.

12. The semiconductor device according to any of clauses 7-11, wherein the configuration information comprises at least one of an amount of test data, an address in the memory of the host computer where the test results are to be stored, or an identifier of the test.

13. The semiconductor device according to any of clauses 7-12, wherein the test data comprises at least one of an amount of test data, an address in the memory of the host computer where the test results are to be stored, or an identifier of the test.

14. The semiconductor device according to any of clauses 7-13, wherein the test data transfer unit further determines configuration information for a second test of the semiconductor device based on information included in the test data for the test; reads, via the high-speed data transfer link, test data for the second test from memory of the host computer using direct memory access; sends the test data for the second test to the plurality of components via the test bus; causes one or more operations to be performed on the semiconductor device to effect at least a portion of the second test; and after the one or more operations have completed, retrieves test results of the at least a portion of the second test from the test bus and stores, via the high-speed data transfer link, the test results of the at least a portion of the second test in the memory of the host computer using direct memory access.

15. The semiconductor device according to any of clauses 7-14, wherein the configuration information further comprises a configuration for a clock on the semiconductor device.

16. In some embodiments, one or more non-transitory computer readable media storing instructions that, when executed by one or more processors, cause the one or more processors to perform steps of allocating a first block of memory for storing test data; allocating a second block of memory for storing test results; storing test data associated with a first test in the first block of memory; transmitting configuration information associated with the first test to a data transfer unit on a semiconductor device; sending a test start command to the test data transfer unit; and in response to receiving a notification from the test data transfer unit that the first test has completed, accessing test results that are associated with the first test and have been stored in the second block of memory for processing.

17. The one or more non-transitory computer-readable media according to clause 16, wherein the configuration information comprises an address of the first block of memory.

18. The one or more non-transitory computer-readable media according to clause 16 or clause 17, wherein the test data comprises configuration information for a second test of the device.

19. The one or more non-transitory computer-readable media according to any of clauses 16-18, wherein the configuration information further comprises a configuration for a clock on the device.

20. The one or more non-transitory computer-readable media according to any of clauses 16-19, wherein the first block of memory comprises a plurality of sub-blocks organized as a linked list.

Any and all combinations of any of the claim elements recited in any of the claims and/or any elements described in this application, in any fashion, fall within the contemplated scope of the present embodiments and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A method for testing a semiconductor device that is implemented by the semiconductor device, the method comprising:
   receiving, by the semiconductor device and from a computer, instructions for performing a first test on the semiconductor device;
   reading, by the semiconductor device via a high-speed data transfer connection, test data associated with the first test from a memory of the computer, wherein the memory of the computer that stores the test data read by the semiconductor device is external to the semiconductor device;
   distributing the test data to one more components of the semiconductor device;
   causing one or more operations to be performed on the semiconductor device to implement at least a portion of the first test; and
   after the one or more operations have completed, storing, via the high-speed data transfer connection, test results related to the at least a portion of the first test in the memory of the computer.

2. The method of claim 1, further comprising, after storing the test results, notifying the computer that the test is complete.

3. The method of claim 1, wherein the instructions for performing the test include an address in the memory of the computer where the test data is stored.

4. The method of claim 1, wherein the instructions comprise at least one of an amount of test data, an address in the memory of the computer where the test results are to be stored, or an identifier of the test.

5. The method of claim 1, wherein the test data comprises at least one of an amount of test data, an address in the memory of the computer where the test results are to be stored, or an identifier of the test.

6. The method of claim 1, further comprising:
   determining, by the test data transfer unit, instructions for a second test of the semiconductor device based on information included in the test data for the test;
   reading, via the high-speed data transfer connection, test data for the second test from memory of the computer;
   distributing, by the test data transfer unit, the test data for the second test to the one or more components of the semiconductor device;
   causing one or more operations to be performed on the semiconductor device to perform at least a portion of the second test; and
   after the one or more operations have completed, storing, unit via the high-speed data transfer connection, test results related to that at least a portion of the second test in the memory of the computer.

7. A semiconductor device, comprising:
   a plurality of components;
   a test bus; and
   a test data transfer unit;
   wherein the test data transfer unit:
      receives, from a host computer, configuration information for performing a test of the semiconductor device;
      reads, via a high-speed data transfer link, test data associated with the test from memory of the host computer using direct memory access, wherein the memory of the host computer that stores the test data read by the semiconductor device is external to the semiconductor device;
      sends the test data to the plurality of components via the test bus;
      causes one or more operations to be performed on the semiconductor device to effect at least a portion of the test; and
      after the one or more operations have completed, retrieves test results of the at least a portion of the test from the test bus and stores, via the high-speed data transfer link, the test results in the memory of the host computer using direct memory access.

8. The semiconductor device of claim 7, wherein the high-speed data transfer link comprises a peripheral component interface express (PCIe) link.

9. The semiconductor device of claim 7, wherein after storing the test results, the test data transfer unit sends a notification to the host computer that the test is complete.

10. The semiconductor device of claim 9, wherein the notification includes an identifier for the test.

11. The semiconductor device of claim 7, wherein the configuration information comprises an address in the memory of the host computer where the test data is stored.

12. The semiconductor device of claim 7, wherein the configuration information comprises at least one of an amount of test data, an address in the memory of the host computer where the test results are to be stored, or an identifier of the test.

13. The semiconductor device of claim 7, wherein the test data comprises at least one of an amount of test data, an address in the memory of the host computer where the test results are to be stored, or an identifier of the test.

14. The semiconductor device of claim 7, wherein the test data transfer unit further:
determines configuration information for a second test of the semiconductor device based on information included in the test data for the test;
reads, via the high-speed data transfer link, test data for the second test from memory of the host computer using direct memory access;
sends the test data for the second test to the plurality of components via the test bus;
causes one or more operations to be performed on the semiconductor device to effect at least a portion of the second test; and
after the one or more operations have completed, retrieves test results of the at least a portion of the second test from the test bus and stores, via the high-speed data transfer link, the test results of the at least a portion of the second test in the memory of the host computer using direct memory access.

15. The semiconductor device of claim 7, wherein the configuration information further comprises a configuration for a clock on the semiconductor device.

16. One or more non-transitory computer readable media storing instructions that, when executed by one or more processors, cause the one or more processors to perform steps of:
allocating a first block of memory for storing test data;
allocating a second block of memory for storing test results;
storing test data associated with a first test in the first block of memory, wherein the test data is made accessible for reading by a semiconductor device under test via a high-speed data transfer link, and wherein the first block of memory that stores the test data read by the semiconductor device resides external to the semiconductor device;
transmitting configuration information associated with the first test to a data transfer unit on the semiconductor device;
sending a test start command to the test data transfer unit; and
in response to receiving a notification from the test data transfer unit that the first test has completed, accessing test results that are associated with the first test and have been stored in the second block of memory for processing.

17. The one or more non-transitory computer-readable media of claim 16, wherein the configuration information comprises an address of the first block of memory.

18. The one or more non-transitory computer-readable media of claim 16, wherein the test data comprises configuration information for a second test of the device.

19. The one or more non-transitory computer-readable media of claim 16, wherein the configuration information further comprises a configuration for a clock on the device.

20. The one or more non-transitory computer-readable media of claim 16, wherein the first block of memory comprises a plurality of sub-blocks organized as a linked list.

* * * * *